(12) United States Patent
Denteneer et al.

(10) Patent No.: US 9,721,442 B2
(45) Date of Patent: Aug. 1, 2017

(54) EMERGENCY MANAGER FOR A LIGHTING DEVICE

(71) Applicant: PHILIPS LIGHTING HOLDING B.V., Eindhoven (NL)

(72) Inventors: Theodorus Jacobus Johannes Denteneer, Eindhoven (NL); Lorenzo Feri, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/775,008

(22) PCT Filed: Mar. 11, 2014

(86) PCT No.: PCT/IB2014/059619
§ 371 (c)(1),
(2) Date: Sep. 11, 2015

(87) PCT Pub. No.: WO2014/141058
PCT Pub. Date: Sep. 18, 2014

(65) Prior Publication Data
US 2016/0027265 A1    Jan. 28, 2016

Related U.S. Application Data

(60) Provisional application No. 61/776,997, filed on Mar. 12, 2013.

(51) Int. Cl.
| | | |
|---|---|---|
| *G08B 17/12* | (2006.01) | |
| *G08B 7/06* | (2006.01) | |
| *H05B 33/08* | (2006.01) | |
| *H05B 37/02* | (2006.01) | |
| *G08B 17/06* | (2006.01) | |
| *G08B 21/12* | (2006.01) | |
| *G08B 21/18* | (2006.01) | |
| *H04B 10/116* | (2013.01) | |

(52) U.S. Cl.
CPC .............. *G08B 7/06* (2013.01); *G08B 7/066* (2013.01); *G08B 17/06* (2013.01); *G08B 21/12* (2013.01);
(Continued)

(58) Field of Classification Search
CPC .......... H04B 10/116; G01S 1/70; G08B 7/06; G08B 17/06; G08B 21/12; G08B 21/185
(Continued)

(56) References Cited

U.S. PATENT DOCUMENTS 5,060,309 A * 10/1991 Narita ................. G08B 13/187
398/187
6,668,178 B1 * 12/2003 Ramaswamy .... H04M 1/72502
455/343.6
(Continued)

FOREIGN PATENT DOCUMENTS

CN         101753214 A      6/2010
EP         2509398 A1       10/2012
(Continued)

*Primary Examiner* — Tai T Nguyen
(74) *Attorney, Agent, or Firm* — Meenakshy Chakravorty

(57) ABSTRACT

An emergency manager for a lighting device (1), which lighting device is configured to transmit information by coding its output light. The emergency manager has a light coding unit (5), configured to code light emitted by a light emitter (3), thereby enabling the light emitter to emit a coded light signal including an individual identifier identifying the lighting device; an emergency indicator (7); and a control unit (9). The control unit is configured to control the light coding unit to adjust the coded light signal to increase a robustness of a transmission of the coded light signal upon receiving an emergency indication from the emergency indicator.

15 Claims, 3 Drawing Sheets

(52) U.S. Cl.
CPC ......... *G08B 21/185* (2013.01); *H04B 10/116* (2013.01); *H05B 33/0842* (2013.01); *H05B 37/0272* (2013.01)

(58) Field of Classification Search
USPC ................. 340/577, 601, 650, 691.8, 815.45
See application file for complete search history.

(56) References Cited

U.S. PATENT DOCUMENTS

| | | | |
|---|---|---|---|
| 7,020,399 B1* | 3/2006 | Miyata | H04B 10/505 398/158 |
| 8,053,996 B2* | 11/2011 | Sawada | H05B 33/0818 315/136 |
| 2006/0056855 A1 | 3/2006 | Nakagawa et al. | |
| 2009/0284366 A1* | 11/2009 | Haartsen | G01S 1/70 340/531 |
| 2010/0135669 A1 | 6/2010 | Kim et al. | |
| 2012/0146804 A1 | 6/2012 | Kim et al. | |

FOREIGN PATENT DOCUMENTS

| | | |
|---|---|---|
| JP | 2006115539 A | 4/2006 |
| JP | 2008186602 A | 8/2008 |
| KR | 20100125137 A | 11/2010 |
| WO | 2004057543 A1 | 7/2004 |
| WO | 2009072053 A1 | 6/2009 |
| WO | 2009101570 A1 | 8/2009 |
| WO | 2011051865 A1 | 5/2011 |
| WO | 2012052935 A1 | 4/2012 |

\* cited by examiner

EMERGENCY MANAGER FOR A LIGHTING DEVICE

CROSS-REFERENCE TO PRIOR APPLICATIONS

This application is the U.S. National Phase application under 35 U.S.C. §371 of International Application No. PCT/IB2014/059619, filed on Mar. 11, 2014, which claims the benefit of U.S. Provisional Patent Application No. 61/776,997, filed on Mar. 12, 2013. These applications are hereby incorporated by reference herein.

FIELD OF THE INVENTION

The present invention relates to an emergency manager for a lighting device (1), which lighting device is configured to transmit information by coding its output light, comprising a light coding unit and an emergency indicator.

BACKGROUND OF THE INVENTION

Indoor localization enabled by Coded Light is known, for example as disclosed in WO 2004/057543. The working principle is simple; each lighting device installed in the ceiling has a unique identifier, which is embedded in its light output. Thus, in addition to the basic illumination function of the lighting device it is additionally employable for transmitting information. A map of all unique identifiers and their corresponding location is created, e.g. during an initial commissioning/mapping phase. During the operational phase, users have a handheld detector capable of detecting the unique identifiers and providing localization or navigation information via a user interface. Hence, by just holding the handheld detector in the hand, users can see on the user interface information related to the location or to the direction they should take.

In case of an emergency these kind of lighting devices are even more useful in guiding users, e.g. guiding them out of a building, or guiding rescue personnel through a building. This has been described in US 2012/0146804, which discloses lighting devices used for communicating emergency information and an escape guide lighting signal indicating an escape direction.

However, in some emergency situations the air is filled with smoke and the like, attenuating the light output of the lighting devices. Thereby the emergency function is deteriorated.

SUMMARY OF THE INVENTION

It would be advantageous to increase the detectability of the information coded into the light output in an emergency situation. To better address this concern, in a first aspect of the invention there is presented an emergency manager for a lighting device configured to transmit information by coding its output light, comprising; a light coding unit, configured to code light emitted by a light emitter, thereby enabling the light emitter to emit a coded light signal including an individual identifier identifying the lighting device; an emergency indicator; and a control unit. The control unit is configured to control the light coding unit to adjust the coded light signal to increase a robustness of a transmission of the coded light signal upon receiving an emergency indication from the emergency indicator.

In contrast to what is disclosed in above-mentioned US 2012/0146804, the robustness of the transmission of the coded light signal is increased when an emergency situation occurs. The expression "increase a robustness of the transmission of the coded light signal" is to be understood as to make the transmission less sensitive to different kinds of interferences. The likelihood of detecting the coded light signal is thereby increased in comparison to the prior art. Signal adjustments that increase the robustness will be described below. It is undesired to provide a permanently increased robustness, since typically such adjustments of the coded light signal tend to cause the light emitted from the light emitter to flicker in a manner which is visible to the human eye (hereinafter, "visible flicker"). Under normal conditions the strength of the coded light relative to the total light output is such as to avoid visible flicker, while still providing a reliable detection.

In accordance with an embodiment of the emergency manager, the adjustment of the coded light signal includes at least one of increasing its modulation depth, lowering its frequency, and changing its type of coding. That is, there are different ways of increasing the robustness of the transmission of the coded light signal, and at least one of these or a combination of more than one can be advantageously applied.

In accordance with an embodiment of the emergency manager, it further comprises a reserve power unit, and the emergency indicator comprises a mains power sensor configured to generate an emergency indication when the mains power is lost.

Thereby, the emergency manager is capable of continuing to cause the light emitter to emit coded light when mains power is lost, and additionally it interprets such a loss as an emergency situation.

In accordance with an embodiment of the emergency manager, the emergency indicator comprises a smoke detector.

In accordance with an embodiment of the emergency manager, the emergency indicator comprises an air pollution detector. This embodiment is advantageous in outdoor applications when severe air pollution occurs. Additional indicator options will be described below.

In accordance with an embodiment of the emergency manager, the coded light signal includes information about the position of the emergency manager.

In this embodiment the emergency manager itself contains information about its position relative to some predefined reference, such as its position within a building or on a map.

Furthermore, according to embodiments disclosed herein, there is provided a lighting device, which comprises an emergency manager as defined above, and a light emitter.

Furthermore, according to embodiments disclosed herein, there is provided a lighting system, which comprises several lighting devices as defined above, and a light detector configured to detect the coded light signal.

In accordance with an embodiment of the lighting system it comprises a central system controller, which is connected with the lighting devices. For instance, the central system controller can be used for providing the lighting devices with information of different kinds, such as position information, and emergency alerts.

In accordance with another aspect of the present invention, there is provided a method of controlling a light emitter, which is configured to transmit information by coding its output light, comprising:

controlling the light emitter to emit a coded light signal including an individual identifier identifying the lighting device;

detecting a state of emergency; and
adjusting the coded light signal to increase a robustness of a transmission of the coded light signal upon detection of a state of emergency.

The method provides advantages corresponding to those of the emergency manager.

These and other aspects and advantages of the invention will be apparent from and elucidated with reference to the embodiments described hereinafter.

BRIEF DESCRIPTION OF THE DRAWINGS

Embodiments will now be described in more detail and with reference to the appended drawings in which.

DESCRIPTION OF PREFERRED EMBODIMENTS

Figure 1:
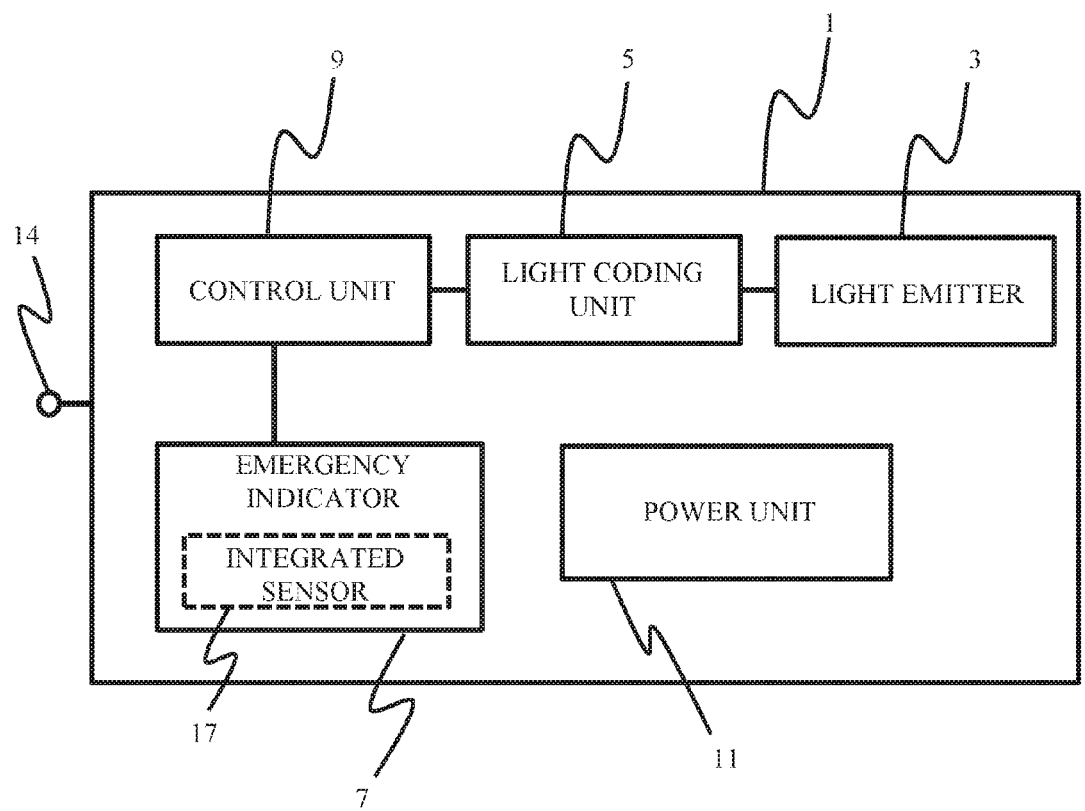
FIG. 1 is a block diagram of an embodiment of the lighting device including an emergency manager according to the present invention.

An embodiment of the emergency manager is shown arranged in a lighting device 1, which comprises a light emitter 3. The light emitter is a LED (Light Emitting Diode) light source, including one or more LEDs, but other kinds of light emitters are feasible as well, as will be understood by the person skilled in the art. The emergency manager comprises a light coding unit 5, which is configured to code the light emitted by the light emitter 3, i.e. the light coding unit 5 enables the light emitter 3 to emit the coded light. Thus, the lighting device 1 is configured to emit a coded light signal embedded in its ordinary light output. The coded light signal includes an individual identifier identifying the lighting device. Furthermore, the emergency manager comprises an emergency indicator 7, which is configured to indicate that an emergency situation has occurred, a control unit 9, and a reserve power unit, such as a battery 11. The lighting device 1 is connected to the mains 14 for power supply. The control unit 9 is connected with the light coding unit 5, and is configured to control the light coding unit 5 to adjust the coded light signal to increase the robustness of the transmission of the coded light signal upon receiving an emergency indication from the emergency indicator 7.

It should be noted that the emergency manager can be integrated with a lighting device in the above-described way, integrated in a light emitter drive unit such as a LED driver, etc., as well as provided as a separate device, which is connectible to a light emitter, or the like.

Typically, several lighting devices 1, comprising the emergency manager, are used in a lighting system 13 also comprising one or more light detectors 15 configured to detect the coded light signal. The light detector 15 has a user interface 16, including a display. The lighting system 13 is useable in many different applications. Typically, the lighting devices 1 are mounted at the ceilings of premises, such as flats shops, concert halls, sports centers, etc., in a building; but many outdoor applications are feasible as well, such as street lighting, and different public places.

Figure 3:
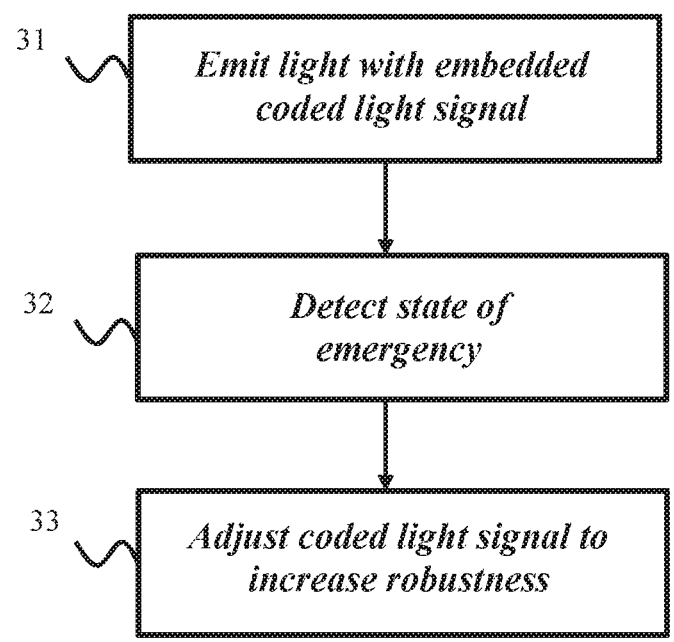
FIG. 3 is a flow chart of an embodiment of the method of controlling a light emitter according to this invention.

When the lighting device 1, and thus the emergency manager, is switched on during normal operation conditions, the control unit 9 will modulate the light emitter 3 to emit the coded light signal, which encodes some information, as shown in box 31 in FIG. 3. This information will contain the above-mentioned identifier, which can be used for localization purposes, but also other useful information, e.g. relating to the condition of the lighting device 1 or its battery 11, can be encoded into the coded light signal. The modulation will be provided so that it causes no hindrance, such as visible flicker, to the occupants of the premises of the lighting device 1. For instance, it is well known that the modulation causes no visible flicker if the modulation depth is below some threshold, e.g. 10%.

A map of all unique identifiers and their corresponding positions is created, e.g. during an initial commissioning/mapping phase. Alternatively, or additionally, the lighting devices 1 are configured to receive and store their position, which is then included in coded light signal, at least in an emergency state.

In an emergency situation, the coded light signal emitted from the lighting device 1 may be one of the few functions still operating in the building. For example, it is not likely that the mains or the local computer network will still function properly. However, the lighting devices 1 will still be functioning properly, powered by the battery 11. Therefore, the coded light signal emitted by the lighting devices 1 could be a vital means remaining to guide people, such as rescue workers, through the building.

In such an emergency situation, the requirements for the coded light signal change. Thus, it is required that the light detector 15 can receive the coded light signal as fast as possible so that the timing requirements will be more strict. Additionally, the environment may contain smoke or particles, which hamper the reception of the coded light signal. Both requirements demand for a stronger, or at least more distinct, signal so that reception may be both easier and faster. On the other hand, in this emergency situation, the requirement for a visually imperceptible modulation is less strict.

Consequently, when a state of emergency is detected, in box 32 in FIG. 3, the emergency manager will change its encoding and/or modulation scheme. Similarly, if the lighting device 1 is off when the state of emergency is detected it will be switched on and start emitting light in the changed state. In this embodiment the emergency indicator 7 will indicate an emergency state to the control unit 9. The control unit 9 will then adjust the coded light signal, in box 33, by setting/increasing the modulation depth of the coded light signal to a modulation depth that is higher than under normal operation conditions to improve both reception speed and reliability. Generally, the control unit 9 increases the robustness of the coded light signal, and thus increases the robustness of the transmission thereof. There are many other ways to increase the robustness. For example, for a coded light signal modulated by some kind of pulse modulation, such as PWM (Pulse Width Modulation), PPM (Pulse Position Modulation) or PCM (Pulse Code Modulation), as is commonly used to generate coded light signals, the control unit 9 can adjust different pulse parameters. For instance the control unit 9 adjusts the pulse width such that the variation of the pulse width is increased; or introduces larger deviations from a nominal center position. According to further examples, the control unit 9 lowers the frequency of the coded light signal or changes its type of coding.

The method as described herein can be implemented by a computer program, which when run on a processor included in the emergency manager causes the emergency manager to perform the method steps in cooperation with the light emitter. The computer program can be pre-programmed in the emergency manager or downloadable from Internet, etc.

According to yet a further embodiment, when an emergency situation occurs, the information included in the coded light signal is limited to a minimum, containing only emergency information. For instance, the coded signal only transmits its identification or position if it is stored in the lighting device 1. Thus, information that is not strictly needed during emergency operation but that serves regular maintenance only is omitted. Additionally, the coded light signal may be transmitted leaving out security mechanisms, if applied during the normal operation.

Figure 2:
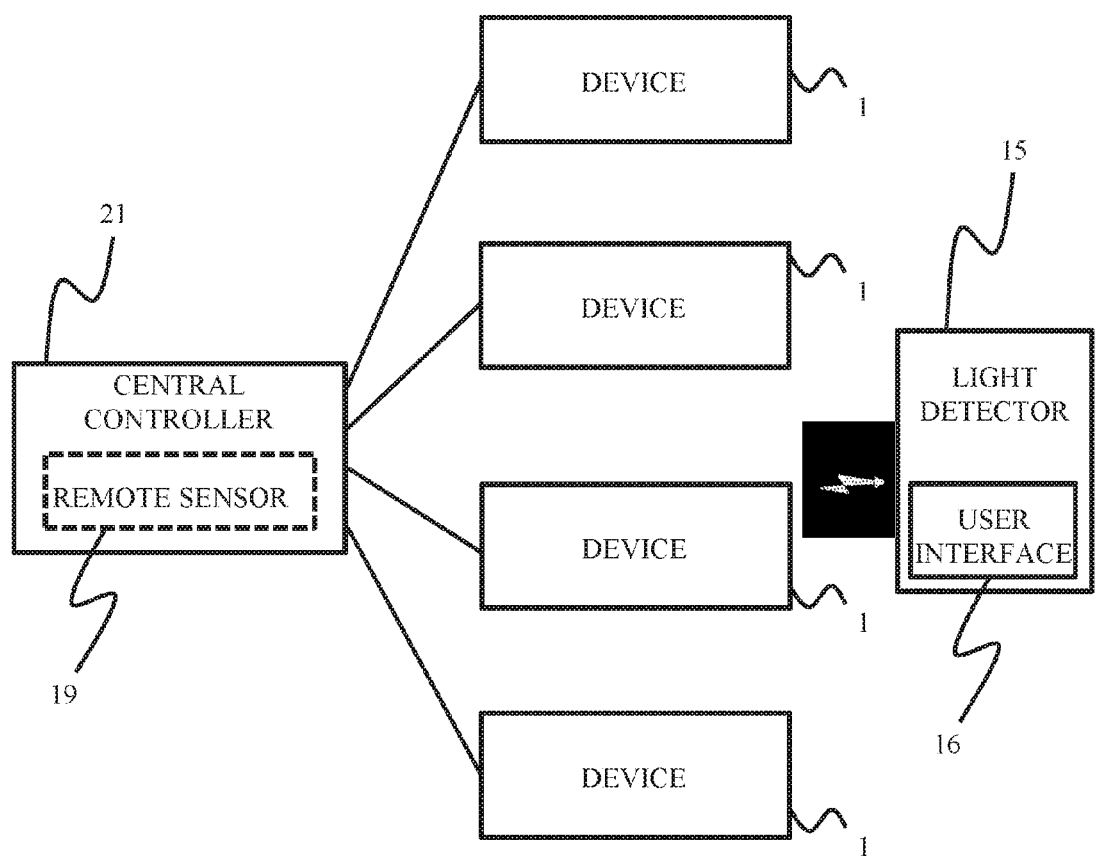
FIG. 2 is a block diagram of a lighting system comprising several lighting devices of FIG. 1.

The emergency indicator 7 receives information about an emergency situation by means of either an integrated sensor 17, which reacts directly on an emergency event, or a remote sensor 19, shown with broken lines in FIG. 2, sending emergency information to the emergency indicator 7. For instance, the remote sensor 19 is part of a central controller 21 of the lighting system 13, where the central controller 21 sends emergency information to all lighting devices 1 of the lighting system 13. Examples of emergency events are; loss of mains power, fire, outdoor air pollution, a storm, an earthquake, etc.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An emergency manager for a lighting device, which lighting device is configured to transmit information by coding its output light, comprising:
   a light coding unit, configured to code light emitted by a light emitter, thereby enabling the light emitter to emit a coded light signal including an individual identifier identifying the lighting device;
   an emergency indicator comprising a sensor, the emergency indicator configured to indicate that an emergency situation has occurred; and
   a control unit; wherein
   the control unit is configured to control the light coding unit to adjust the coded light signal to increase a detectability of a transmission of the coded light signal upon receiving the emergency indication from the emergency indicator during the emergency situation.

2. The emergency manager according to claim 1, wherein the adjustment of the coded light signal includes at least one of increasing its modulation depth, lowering its frequency, and changing its type of coding.

3. The emergency manager according to claim 1, further comprising a reserve power unit, wherein the emergency indicator comprises a mains power sensor configured to generate an emergency indication when the mains power is lost.

4. The emergency manager according to claim 1, wherein the coded light signal is a pulse modulated signal, wherein the adjustment of the coded light signal includes at least one of adjusting the pulse width such that the variation of the pulse width is increased; or increasing pulse deviations from a nominal center position.

5. The emergency manager according to claim 1, wherein the emergency indicator comprises a fire detector.

6. The emergency manager according to claim 1, wherein the emergency indicator comprises an air pollution detector.

7. The emergency manager according to claim 1, wherein the coded light signal includes information about a position of the lighting device.

8. A lighting device comprising an emergency manager according to claim 1, and a light emitter, connected with the emergency manager.

9. A lighting system comprising several lighting devices according to claim 8, and a light detector configured to detect the coded light signal.

10. The lighting system according to claim 9, comprising a central system controller, which is connected with the lighting devices.

11. A method of controlling a light emitter, which is configured to transmit information by coding its output light, comprising:
    controlling the light emitter to emit a coded light signal including an individual identifier identifying the lighting device;
    detecting a state of emergency with an emergency indicator comprising a sensor; and
    adjusting the coded light signal to increase a detectability of a transmission of the coded light signal upon detection of the state of emergency.

12. The method according to claim 11, said adjusting the coded light signal including at least one of increasing its modulation depth, lowering its frequency, and changing its type of coding.

13. The method according to claim 11, said detecting the state of emergency comprises at least one of detecting a loss of mains power, detecting fire, and detecting air pollution.

14. The method according claim 11, said adjusting the coded light signal comprising limiting the information included in the coded light signal to emergency related information.

15. A non-transitory computer program enabling a processor to carry out the method according to claim 11.

* * * * *